April 18, 1961 R. T. JOLLY 2,980,039
FROZEN CONFECTION
Filed July 10, 1959 2 Sheets-Sheet 1
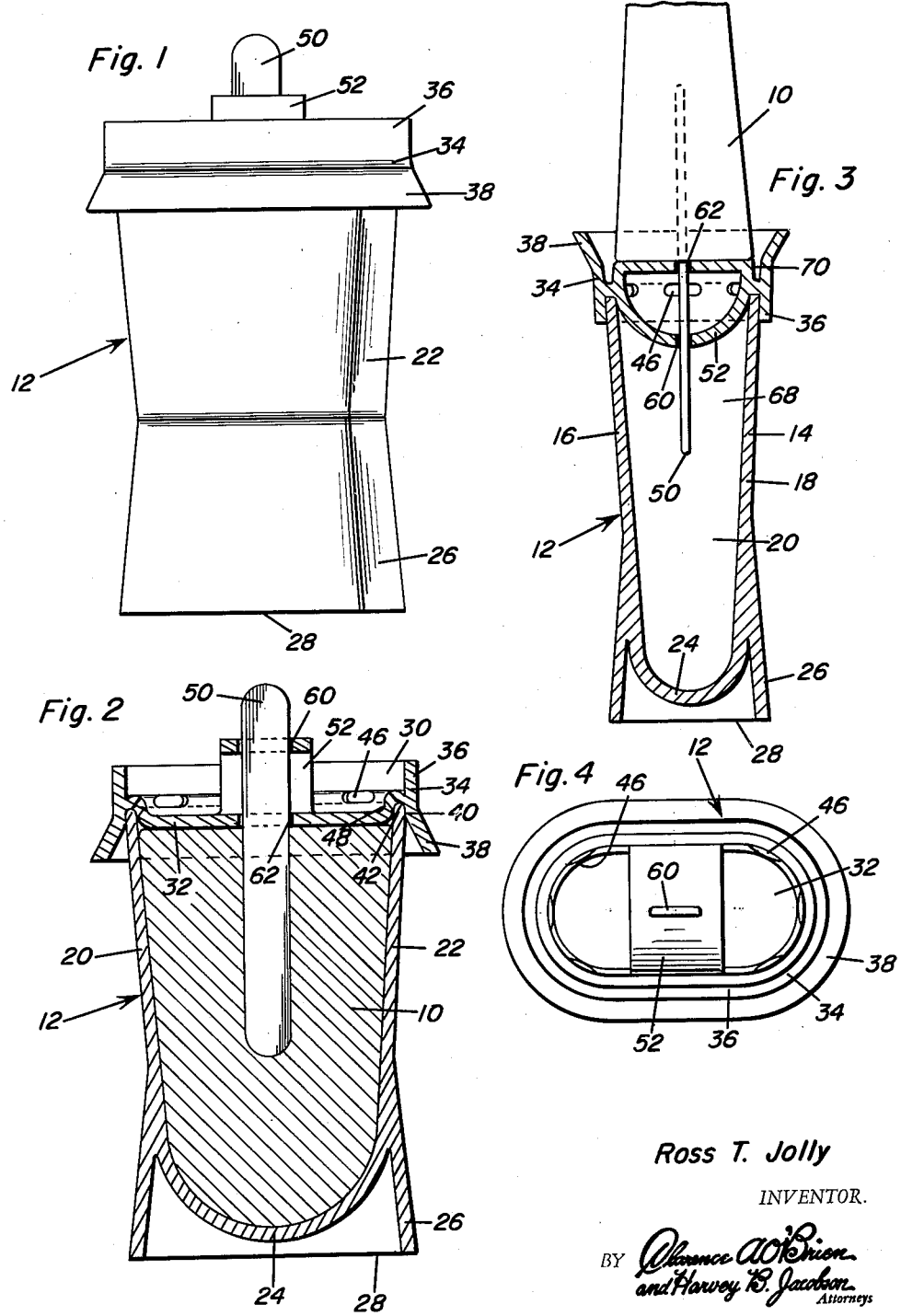
Ross T. Jolly
INVENTOR.

April 18, 1961  R. T. JOLLY  2,980,039
FROZEN CONFECTION
Filed July 10, 1959  2 Sheets-Sheet 2
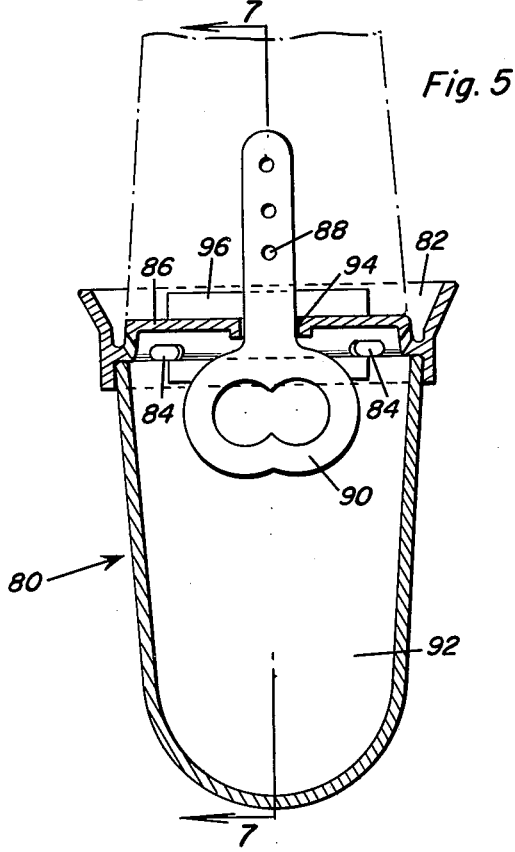
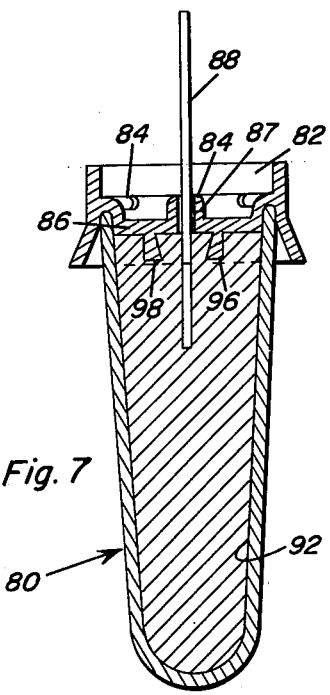
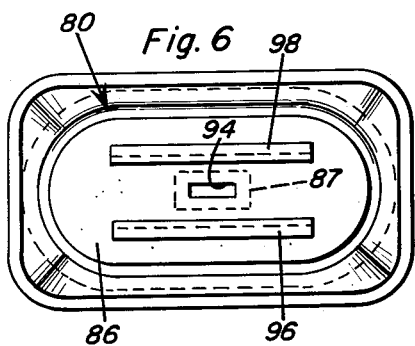
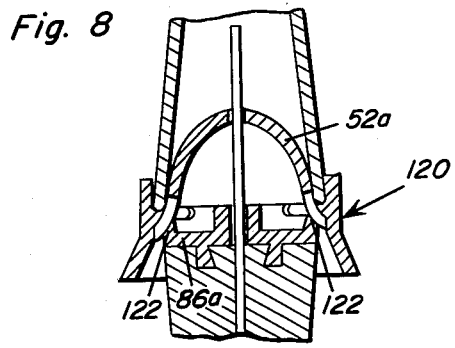
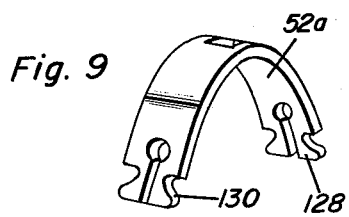
Ross T. Jolly
INVENTOR.

United States Patent Office

2,980,039
Patented Apr. 18, 1961

2,980,039
FROZEN CONFECTION
Ross T. Jolly, 161 W. Los Angeles Drive, Vista, Calif.
Filed July 10, 1959, Ser. No. 826,253
6 Claims. (Cl. 107—19)

This invention relates to frozen confections and more particularly to a holder for frozen confections.

There are two principal phases of the invention. In the first the holder is actually a mold within which the frozen confection is made. Therefore, the holder is used by the manufacturere, the vender and the vendee.

In the second phase, the holder is capable of functioning as a support to maintain the frozen confection in an upright position. In both cases, the holder is so constructed that there is a drip tray located beneath the frozen confection when it is in the eating position, and the drip tray channels the liquid which naturally and ordinarily drips from the frozen confection, to a place within the holder where it is accumulated. This promulgates cleanliness in the eating of a frozen confection.

The frozen confection may be varied. It may be of the frozen water-type, for example, "pop-cicles" or may be a frozen ice cream bar or other easily melted confections.

Accordingly, an object of the invention is to provide a multipurpose holder for a frozen confection.

Another object of the invention is to provide a holder which promotes cleanliness in the eating of a frozen confection.

A further object of the invention is to provide a holder which may be used as a mold within which to manufacture the frozen confection.

A further object of the invention is to provide a holder which has the feature of collecting or at least, channeling the liquid dripped from the frozen confection and collecting it in a portion of the holder.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a side elevational view of a frozen confection in a holder in accordance with the invention.

Figure 2 is a longitudinal sectional view of the assembly in Figure 1.

Figure 3 is a cross sectional view showing the holder in the position at which the frozen confection is supported for eating.

Figure 4 is a top view of the assembly in Figure 1.

Figure 5 is a longitudinal sectional view showing a modification of the invention.

Figure 6 is a top view of the modification in Figure 5.

Figure 7 is a longitudinal sectional view taken on the line 7—7 of Figure 5.

Figure 8 is a fragmentary sectional view showing another modification.

Figure 9 is a perspective view of a part of the modification in Figure 8.

In the accompanying drawings reference is first made to Figures 1-4. In these figures there is a typical frozen confection 10 with which holder 12 is used. The holder is constructed of a body 14, preferably made of plastic, and having front and rear walls 16 and 18 together with side walls 20 and 22. The lower wall 24 attached to the front and rear and side walls, is curved in the form of a segment of a cylinder or essentially so, and it has a skirt 26 around it. The skirt is formed integral or otherwise secured to the walls 16, 18, 20 and 22 and has a flat lower surface 28 so that it may function as a stand to support the frozen confection on a supporting surface or to otherwise support the body which is in the form of an open top receptacle.

Closure 30 is separably connected to the open top of the receptacle and is made of a transverse wall 32 having a skirt 34 with a portion 36 extending upwardly therefrom and an outwardly flared portion 28 extending downwardly therefrom. A downwardly opening groove 40 is at the juncture of wall 32 and skirt 34 and forms a pocket within which the upper edge 42 of the four walls 16, 18, 20 and 22, is frictionally fitted. This separably retains the closure 30 on the receptacle.

There is a group of apertures, for example, slots 46, extending through the short upstanding portion 48 of wall 32 that forms a side of groove 40, and these are blind when the closure is in place on the receptacle inasmuch as the upper edge of the receptacle closes the apertures.

There are means operatively connected with the closure 30 to support stick 50. These means consist of a curved wall 52 in the form of an arch which rises from transverse wall 32 and which is attached at its ends to the walls along the longitudinal edges of the longer sides thereof. Arch forming wall 52 has a slot 60 or another type of aperture therein and it is in alignment with an aperture 62 in wall 52 enabling the stick 50 to be projected therethrough.

In use, the receptacle body of the holder may be filled with a substance which, after freezing, becomes a frozen confection. Stick 50 is slipped into apertures 60 and 62 either before or after the closure 32 is placed on the receptacle prior to freezing.

When it is desired to consume the frozen confection the closure 30 is removed from the receptacle body, taking with it the frozen confection and stick 50 all as one unit. The closure 30 is inverted, and the upper portion 36 of skirt or wall 34 is slipped down over the outer surface of walls 16, 18, 20 and 22 (Figure 3) thereby exposing apertures 46 to the cavity 68 of the receptacle body. When in the inverted position wall portion 38 cooperates with the short wall 48 to form a trough 70 within which the liquid that drips from the frozen confection is accumulated. This liquid flows through slots 46 and enters cavity 68 forming a trap. It is evident from an inspection of Figure 3 that the body may be used as a handle.

Attention is now invited to Figures 5-7, inclusive. In this embodiment there is a receptacle body 80 very similar to the receptacle body 12, except that it has no stand at the lower part thereof. Closure 82 has a wall structure and slots 84 identical to the corresponding wall structure and slots of closure 30. Transverse wall 86 is essentially identical to wall 32, but it has a stick guide and brace 87 around aperture 94. The major difference in this portion of holder 80 is that the stick 88 is in the form of a key in that it has a shank and a grip 90 at one end. The grip is disposed in the cavity 92 of the receptacle body and is apertured to enable the liquid substance which forms the frozen confection to flow therethrough and tightly engage the stick 88. The apertures, of course, are optional. The enlargement forming the key-shape, prevents the stick 88 from slipping through aperture 94 in wall 82 once the stick is passed through aperture 92.

There are additional means for enhancing the gripping action between closure 82 and the frozen confection. These means consist of a pair of dovetail ribs 96 and 98 (Figure 6) which rise from one surface of wall 86 and which become countersunk in the frozen confection when it is in the liquid state. Of course, they remain countersunk in the frozen confection after it is frozen.

The use and operation of holder 80 is the same as that described in connection with holder 12 with the exception of the omission of a stand at the bottom of the receptacle body.

Figures 8 and 9 show a further modification. The receptacle body 120 is essentially the same as those in Figures 2 and 5 but distinguishes therefrom by having the curved wall 52a detachably connected in apertures in the transverse wall 86a. Slotted dovetail keys 128 and 130 at the ends of the curved or arched wall 52a are used for snapping the wall 52a in place.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

1. A holder for a frozen confection, said holder comprising a receptacle body having a cavity and adapted to function as a mold for liquid confection substance during freezing, said mold having an open end, a closure separably connected to said mold body and substantially covering said open end, and means for connecting the closure to the frozen confection in said body, said closure having a skirt, a transverse wall to which said skirt is connected, and a portion of said skirt constituting a trough within which the liquid substance from the frozen confection drips when the closure is arranged to support the frozen confection above said body, said wall having at least one aperture therein in registry with said trough and in registry with the cavity of said receptacle body so that the liquid substance in said trough drains into said cavity body.

2. In a combination mold and holder for a frozen confection, the combination of a receptacle body having a mold cavity and an open end, a closure separably attached to said open end and including a transverse wall, a skirt attached peripherally to said transverse wall, means constituting a part of said skirt for separably attaching said closure to said open end of said body, another portion of said skirt coacting with said wall to form a trough within which the liquid substance dripping from the frozen confection is accumulated, means for connecting said trough with the cavity of said receptacle body so that the liquid in said trough is drained into said cavity.

3. In combination, a mold body adapted to function as a handle and to support a liquid substance which, after freezing, becomes a frozen confection, a closure for said body and separably attached to said body, said closure adapted to be removed with the frozen confection and inverted, and means connected with said closure for securing said closure on to said body after inversion of said closure so that said body functions as a handle while the frozen confection is carried by said closure.

4. The combination of claim 3, wherein there are passage means associated with said closure and registering a part of said closure with the interior of said body so that liquid dripped from the frozen confection flows into said body.

5. The combination of claim 4, wherein there are means connected with said closure for engaging the frozen confection with said closure so that the frozen confection is separable from the body with said closure and so that the frozen confection is maintained attached to said closure when said closure is returned in an inverted position on said body.

6. The combination of claim 3, wherein there are passage means associated with said closure and registering a part of said closure with the interior of said body so that liquid dripped from the frozen confection flows into said body and, wherein there is a skirt connected with said closure and angulated outwardly from the center of said closure to form a trough within which said passage means are registered.

References Cited in the file of this patent

UNITED STATES PATENTS

| | | |
|---|---|---|
| 1,720,190 | Van Horne | July 9, 1929 |
| 1,882,290 | Meagher | Oct. 11, 1932 |
| 1,990,198 | Murphy | Feb. 5, 1935 |
| 2,057,297 | Fatland | Oct. 13, 1936 |

FOREIGN PATENTS

| | | |
|---|---|---|
| 191,556 | Switzerland | Sept. 1, 1937 |